Feb. 14, 1939. H. W. HAPMAN 2,147,199
PIPE CONVEYER ELEVATOR
Filed Sept. 20, 1937 2 Sheets-Sheet 1

Inventor—
Henry W. Hapman

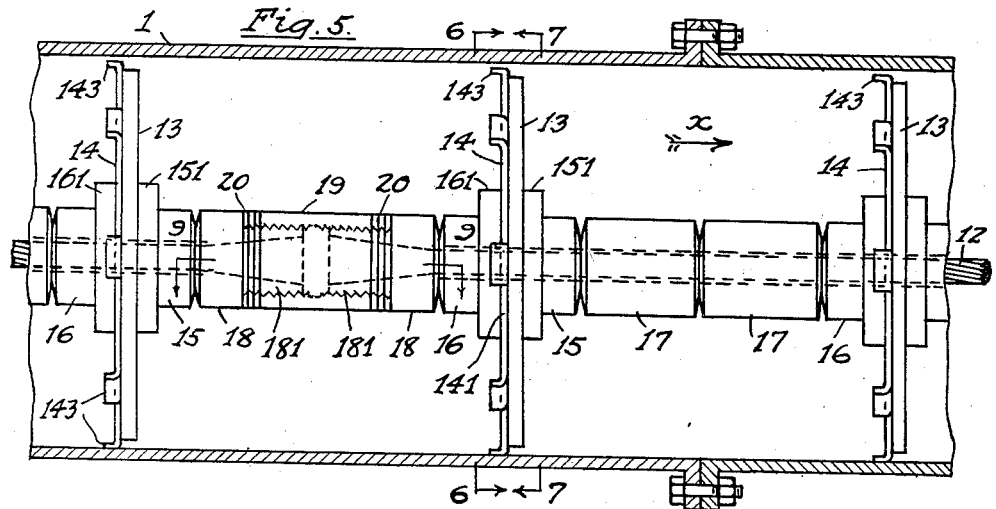
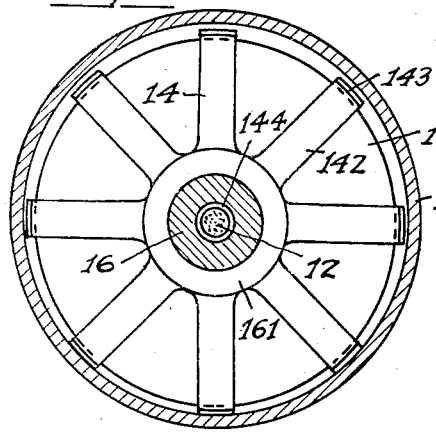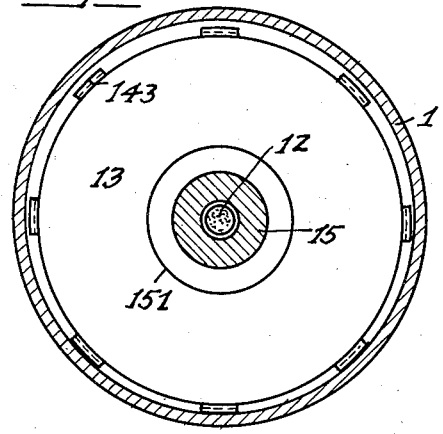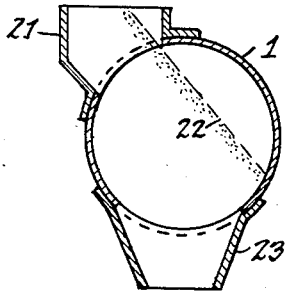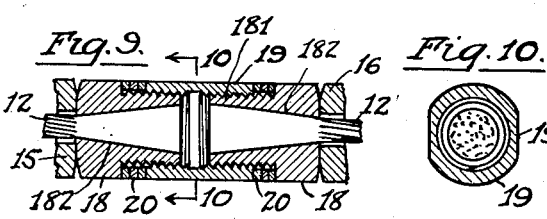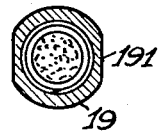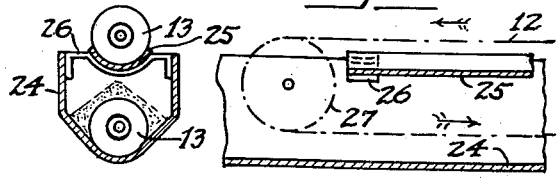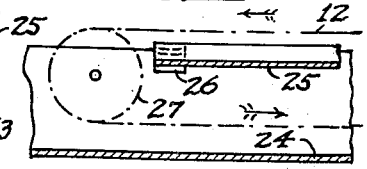

Patented Feb. 14, 1939

2,147,199

UNITED STATES PATENT OFFICE 2,147,199

PIPE CONVEYER ELEVATOR

Henry W. Hapman, Detroit, Mich.

Application September 20, 1937, Serial No. 164,640

9 Claims. (Cl. 198—176)

My invention relates to conveyer-elevators, and its principal object is to provide a conveying and elevating apparatus of the "flight" type which may be made up from ordinary lengths of piping and which has therewithin moving elements by which loose, granular, or pulverulent materials may be conveyed expeditiously and effectively in a horizontal, vertical, or inclined direction so as to meet all possible requirements.

Another object of my invention is to provide a conveyer in which an endless flexible propelling member is built up from a series of standard lengths, having adjustable couplings therebetween by which wear and stretch may be easily taken up so that the over-all length of the said member, as well as the pitch of the sprocket-engaging elements, is maintained practically constant at all times.

A further object of my said invention is to provide a conveyer-elevator in which the conveying elements or flights are of such resilient character that they can adapt themselves to inequalities without excessive strain upon the parts.

Another object is to provide a conveyer in which the construction at the feeding points is such as to eliminate all chance of choking or jamming without the use of any special feeding mechanism.

Another object of my invention is to provide an apparatus of the character described which may be manufactured and installed with the least possible amount of labor and laying out work.

With these and other objects in view, I will now describe a preferred embodiment of my invention, reference being had to the accompanying drawings in which—

Figure 5 is a fragmentary longitudinal section, drawn to an enlarged scale, showing in detail the construction of the stationary pipe or casing and the moving elements for conveying material therealong, the latter being shown in elevation.

Figure 6 is a transverse section taken on line 6—6 of Figure 5.

Figure 7 is a transverse section taken on line 7—7 of Figure 5.

Figure 8 is a transverse section, drawn to a smaller scale, showing details of feeding and discharge hoppers which are particularly adapted for use with my improved apparatus.

Figure 9 is a longitudinal section taken on line 9—9 of Figure 5 showing the method of coupling individual sections of the propelling means and the provision for taking up stretch and wear.

Figure 10 is a transverse section taken on line 10—10 of Figure 9.

Figure 11 is a transverse section, drawn to a reduced scale, illustrating a modified form of conveyer casing which is especially adapted for staight horizontal runs, and Figure 12 is a fragmentary longitudinal section of the same taken upon the center line.

Like characters designate corresponding parts throughout the several views.

Figure 1:
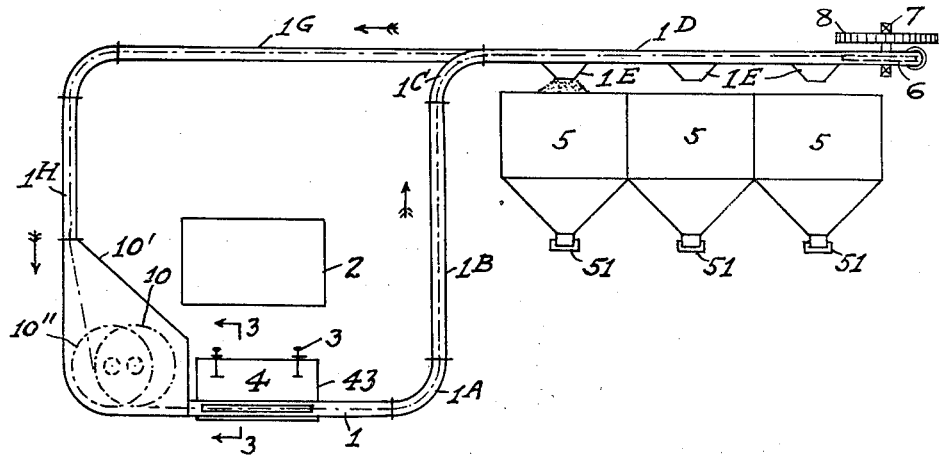
Figure 1 is a side elevation illustrating my improved conveyer-elevator as applied to the handling of material from railroad cars to storage bins.
Figure 2:
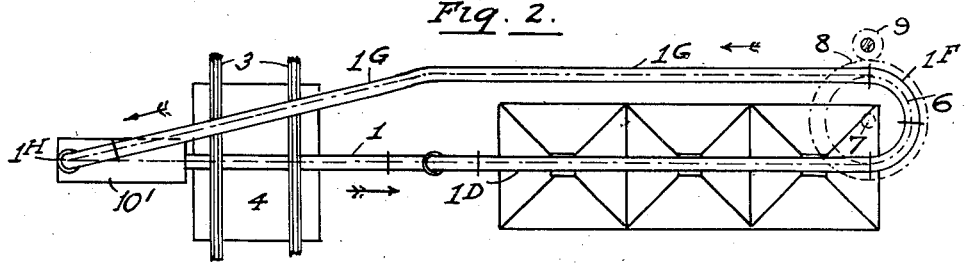
Figure 2 is a plan view of the same.

Referring more particularly to Figures 1 and 2 of the drawings, I designates the stationary pipe or casing which is preferably circular in cross section and made up from sections of commercial piping, which are combined with standard curves of convenient radius so as to be built up quickly and economically to suit all possible requirements as regards location of feeding and discharge points.

In the example shown, the material is discharged from a railroad car 2, running on tracks 3 which pass over a track hopper 4. The casing I passes through the lower portion of the track hopper, around the curve IA, upwards through the vertical run IB, and around the curve IC to the upward discharge run ID, the latter run being provided with discharge hoppers IE by means of which material is transferred to either of the storage bins 5. Ordinarily the discharge hoppers IE will be open at the bottom so that material will be delivered to the first bin until the same is full and then successively to the remaining bins, but in some cases I may provide gates upon the various hoppers so that the material may be discharged selectively into either of the bins in the manner well known in the art. The bins 5 will be furnished with discharge gates 5I or other controlling means which form no part of the present invention so that it is not deemed necessary to describe the same. From the run ID the conveyer passes around the horizontal curve IF and back through horizontal runs IG through the descending run IH and so back to the track hopper. Suitable driving means such as the sprocket 6 mounted upon the shaft 7 and the gear 8 which is driven by the pinion 9 from any source of power supply, as will be understood. In order to adjust the tension of the moving elements of the conveyer, ordinary means of conventional construction may be provided, to include the movable sprocket 10 and suitable means for moving the same gradually within the housing 10' until it reaches the extreme position designated 10".

Figure 3:
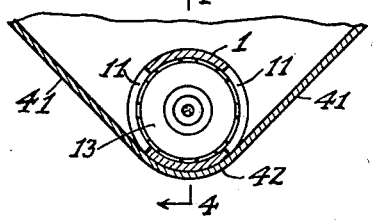
Figure 3 is a transverse section taken on line 3—3 of Figure 1, showing a special construction of the track hopper which is adapted to prevent choking of the conveyer.
Figure 4:
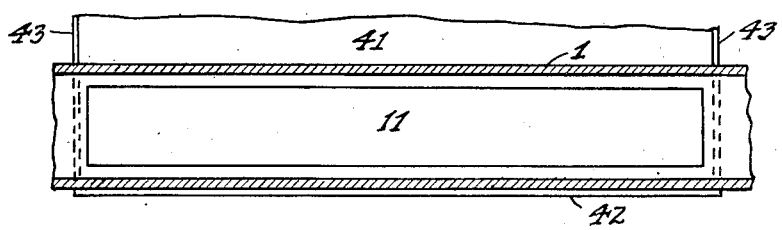
Figure 4 is a longitudinal section of the same taken on line 4—4 of Figure 3.

The track hopper 4 consists essentially of a pair of inclined side members 41 connected by a curved bottom 42 and provided with end partitions 43, as shown more particularly in Figures 3 and 4 of the drawings. The casing 1, where it passes through the track hopper, is provided with one or two lateral openings 11 through which materials discharged from the car 2 are fed into the casing. It will be noted that by this construction the material, entering the casing laterally, is kept in a state of agitation by the passage of the flights or conveying elements 13, which project through the openings 11, and so prevented from bridging or arching in the track hopper as would otherwise be the case.

The propelling member of the conveyer, drawn to an enlarged scale in Figures 5, 6 and 7, consists essentially of a wire rope 12, preferably made in standard sections of, say, ten feet in length, carrying at equally spaced intervals flights 13 of rubber or other resilient material. In cases where the material is to be moved in a vertical direction only, the flights 13 may form the sole propelling means. Under other conditions, however, they are reenforced by resilient members 14 formed of spring steel and comprising a central hub portion 141 and a series of radial arms 142, the outer ends of which are bent at right angles, as indicated at 143. In this construction, the ends 143 rest upon the interior of the casing so as to prevent the rubber flights 13 from coming in contact therewith and to support the weight of the rope and the flights, so that the friction and wear on horizontal and inclined runs is reduced to a minimum.

In flight conveyers of the type employing wire rope as the propelling means as hitherto constructed, the flights have been independently attached to the rope by various methods, all of which resulted in mutilation or compression of the rope which was liable to failure. According to the present invention the flights are fitted loosely upon the rope and are maintained at their proper distance apart by spacing sleeves, the arrangement of which will now be described with particular reference to the Figures 5, 9 and 10 of the drawings.

The flights 13, traveling in the direction of the arrow $x$ in Figure 5, are held between collars 15 and 16 provided with flanges 151, 161, respectively, and when the flight members are reenforced by spring steel members 14, these latter are also held between the collars, the spring steel members being provided with central flanges 144 adapted to rest loosely upon the periphery of the rope 12. The flanges 161, through which the driving effort is exerted, may be of any suitable shape adapted to engage the bifurcated teeth of the driving sprocket, the latter having a sufficient number of teeth to engage each of the said flanges successively. For maintaining the spacing between the flights there are provided loosely fitting sleeves 17, the ends of which are of rounded shape, as shown in Figure 5, and the co-acting ends of the members 15 and 16 are similarly rounded, so that the spacing is not affected by the stretch of the rope.

In order to connect the several sections of rope together I provide sleeves of modified form as shown at 18 in Figures 5 and 9, which have externally threaded portions of reduced diameter 181 connected by an internally threaded coupling 19, the adjacent threads being right and left hand respectively. Between the ends of the coupling 19 and the sleeves 18 are provided a plurality of washers 20 which are removed, one or more at a time, when it is desired to take up stretch of the rope. The coupling 19 and the sleeves 18 are provided with flats, such as indicated at 191 in Figure 10, adapted to be engaged by wrenches, whereby relative rotation of the sleeves and the coupling is obtained. In order to anchor the ends of the rope sections within the sleeves 18, the latter are provided with conical inner surfaces 182 into which the splayed ends of the ropes are secured by pouring in molten zinc or other metal in the manner well known in the art. The bores of the collars 15, 16 and the sleeves 17 may be bell-mouthed or tapered in any suitable manner so as to reduce to a minimum the bending and abrasion of the rope when the same is passing around sprockets and curved portions of the conveyer casing. By this construction, together with the rounded ends of the sleeve, it is contemplated that the life of the rope will be very greatly increased. Further, owing to the loose fitting of the collars 15 and 16 and the sleeves 17 upon the rope, twisting or untwisting of the latter, due to the rotation of the flights and other causes, is avoided. The flights also are capable of adjusting themselves to various positions in relation to the rope when passing around curves, and to rotate upon the rope, so that cutting of channels in the casing by the ends 143 upon the reenforcing members 14 is prevented.

It is regarded as an important feature in the construction above described that the driving force upon the flights and the conveyed material proximate to each section of rope is obtained by a pushing or compressive action between the adjoining collars, so that unusual accuracy is maintained in the pitch of the flights, and the cumulative stretch which occurs in continuous rope conveyers is avoided.

In Figure 8 is shown a transverse section of the pipe or casing 1 on which is mounted a feed hopper 21 positioned laterally in relation to the center line of the casing so that the material discharged into the latter is maintained at the level indicated by the line 22, so that choking of the conveyer by excessive feeding is prevented. 23 in the same figure designates a simple form of discharge hopper which would, of course, be separated longitudinally from the feeding hopper 21.

Figures 11 and 12 show diagrammatically a modified form of the conveyer casing which is particularly adapted for straight horizontal runs. In this case the casing proper, designated 24, is of the open trough type, while the upper return flights are carried upon an arcuate track member 25 supported on transverse brackets 26, the forward and return portions of the conveying element being carried upon sprockets such as 27.

It will be observed from the foregoing description and by reference to the drawings that I have provided a conveying apparatus which is well adapted for the carrying-out of the objects hereinbefore set forth, and while I have herein shown and described a preferred form of my invention, it will be understood by those skilled in the art to which the same relates that various modifications may be made to meet different requirements without departing from the spirit of the invention as defined in the appended claims. For example, where my apparatus is designed solely for elevating material, the reenforcements 14 may be dispensed with and the flight may be a simple disc of rubber, metal, or other suitable material, while in the horizontal form of conveyer shown in Figures 11 and 12, flights of cast iron or other metal would be more desirable, since no resiliency is deemed necessary in this case. The flights also may sometimes be of square or rectangular shape instead of circular as above described, the section of the casing being correspondingly changed. Further, in cases where my improved conveyer is used to handle materials which contain acids or other substances which would render the use of wire rope undesirable, a chain formed from metal or alloy may be substituted therefor.

In all modifications, however, it will be noted that the propelling resistance of the flights is in no case taken up through fastening or gripping of the same upon the flexible driving element, but is carried rearwardly to the nearest coupling member through the loosely fitting elements therebetween.

Having thus described my said invention, what I claim and desire to secure by Letters Patent of the United States is:

1. A conveyer for transporting material in bulk comprising a casing disposed in a desired circuit and provided with entry and discharge openings, a flexible propelling member operating in said casing, and a series of flights arranged in spaced relation therealong, said flights consisting of flat plates formed from rubber or other resilient material provided with reenforcing members of spring steel.

2. A conveyer for transporting material in bulk comprising a casing disposed in a desired circuit and provided with entry and discharge openings, a flexible propelling member operating in said casing, and a series of flights arranged in spaced relation therealong, said flights consisting of flat plates formed from rubber or other resilient material provided with reenforcing members of spring steel having portions projecting beyond the edges of said flights and adapted to guide the same within said casing.

3. A conveyer for transporting material in bulk comprising a casing disposed in a desired circuit and provided with entry and discharge openings, a flexible propelling member operating in said casing, and a series of flights arranged in spaced relation therealong, said flights consisting of flat plates formed from rubber or other resilient material provided with reenforcing members of spring steel having feet projecting radially beyond the edges of said flights and adapted to guide the same within said casing.

4. A conveyer for transporting material in bulk comprising a casing disposed in a desired circuit and provided with entry and discharge openings, a flexible propelling member operating in said casing and made up from a series of relatively short sections connected by longitudinally adjustable coupling means, and a series of flights arranged loosely along each of said sections and maintained in spaced relation by loosely-fitting sleeves positioned between adjacent flights.

5. A conveyer for transporting material in bulk comprising a casing disposed in a desired circuit and provided with entry and discharge openings, a flexible propelling member operating in said casing and made up from a series of relatively short sections having threaded terminal sleeves fixed upon their ends and having co-acting coupling members therebetween, and a series of flights arranged loosely along each of said sections and maintained in equidistant relation by loosely-fitting spacing sleeves positioned between said flights and between said terminal sleeves and their respective adjacent flights.

6. A conveyer for transporting material in bulk comprising a casing disposed in a desired circuit and provided with entry and discharge openings, a flexible propelling member operating in said casing and made up from a series of relatively short sections having threaded terminal sleeves fixed upon their ends and having co-acting coupling members therebetween, and a series of flights arranged loosely along each of said sections and maintained in equidistant relation by loosely-fitting spacing sleeves positioned between said flights and between said terminal sleeves and their respective adjacent flights, said spacing sleeves having tapering bores larger at their ends than at their centers.

7. A conveyer for transporting material in bulk comprising a casing disposed in a desired circuit and provided with entry and discharge openings, a flexible propelling member operating in said casing and made up from a series of relatively short sections having threaded terminal sleeves fixed upon their ends and having co-acting coupling members therebetween, and a series of flights arranged loosely along each of said sections and maintained in equidistant relation by loosely-fitting spacing sleeves positioned between said flights and between said terminal sleeves and their respective adjacent flights, said spacing sleeves having arcuately tapering bores larger at their ends than at their centers.

8. A conveyer for transporting material in bulk comprising a casing disposed in a desired circuit and provided with entry and discharge openings, a flexible propelling member operating in said casing, collars disposed in spaced relation and secured upon said member, and a series of flights rotatably carried upon said member and arranged in driving relation with said collars.

9. A conveyer for transporting material in bulk comrising a casing disposed in a desired circuit and provided with entry and discharge openings, a flexible propelling member operating in said casing made up from a series of relatively short sections connected by longitudinally adjustable coupling means, a series of flights rotatably carried upon said member and arranged in spaced relation therealong intermediate said coupling means, and a series of collars loosely carried upon said member intermediate said flights and said coupling means and adapted to fill the entire space therebetween, whereby the propelling force exerted successively upon the flights is transmitted by compression to the respective adjacent coupling means.

HENRY W. HAPMAN.